Oct. 28, 1958     S. GUARNASCHELLI     2,858,147

RENEWABLE FITTING FOR REINFORCED METALLIC HOSE

Filed April 21, 1954

INVENTOR.

BY Stephen Guarnaschelli
Emery, Varney,
Whittemore & Dix
ATTORNEYS

` # United States Patent Office 2,858,147
Patented Oct. 28, 1958

2,858,147

RENEWABLE FITTING FOR REINFORCED METALLIC HOSE

Stephen Guarnaschelli, Garden City, N. Y., assignor to Titeflex, Inc., Newark, N. J., a corporation of Massachusetts Application April 21, 1954, Serial No. 424,642

4 Claims. (Cl. 285—149)

This invention relates to hose fittings and more especially to a renewable hose fitting for use at the end of a high pressure metal hose which has helical corrugations and an outside braid.

It is an object of the invention to provide an improved end fitting for metal hoses, and to provide an end fitting which will resist high pressure, but which is removable for use on other hoses in the event that the hose becomes worn or damaged.

One feature of the invention relates to an improved construction for holding the end corrugations of the hose in engagement with threads of the fitting so that the fitting can be screwed tightly on the hose and used to compress a washer or gasket against the end of the hose. This construction provides a stronger connection between the hose and the fitting for resisting high pressure and also prevents leakage of the fitting around the end face of the hose when subjected to high pressure.

Another feature of the invention relates to an improved construction for connecting the braid with the end fitting. In the preferred embodiment of the invention, this connection includes a nut which threads over an intermediate fitting element with threads that have the proper clearance for clamping the braid between the threads of the nut and the intermediate fitting.

Other objects, features and advantages of the invention will appear or be pointed out as the description proceeds.

In the drawing, forming a part hereof, in which like reference characters indicate corresponding parts in all the views.

Figure 1:
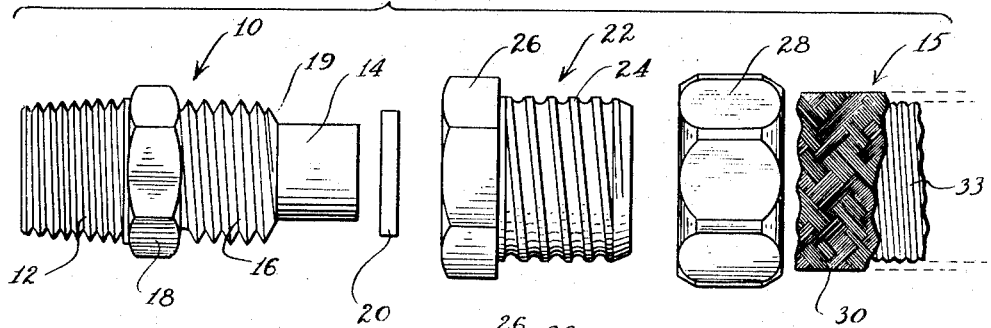
Figure 1 is an exploded view showing the parts of the fitting of this invention separated from one another, and showing a braided metal hose, with part of the braid broken away and to which the fitting is to be connected.

The fitting includes an end fitting element 10 which is preferably of uniform internal diameter throughout its length. On its outside surface, the fitting element 10 has an end section 12 with threads for connecting with a coupling or any other part to which the fitting is to be connected. At its opposite end, the fitting element 10 has a sleeve portion 14 of less outside diameter than the remainder of the fitting element, and of a size to fit into a hose 15.

The fitting element 10 has another threaded section 16 and a polygonal portion 18, between the threaded sections 12 and 16, for receiving a wrench. The end face of the last thread on the threaded section 16 provides a shoulder 19 against which a gasket 20 is clamped when the fitting is assembled and connected with the hose 15. An intermediate fitting element 22 has an inside wall which is threaded throughout its entire length, and has threads 24 extending along a portion of the length of its outside surface. A polygonal portion 26, at one end of the intermediate fitting 22, has flat faces for receiving a wrench.

The final part of the fitting is an outer fitting element or nut 28 with flat faces on its outside surface for receiving a wrench and with threads on its inside surface for screwing over the threads 24 of the intermediate fitting 22. It is a feature of the invention, however, that the nut 28 fits very loosely on the threads 24 and has sufficient clearance between its threads and the threads 24 for clamping a braid 30 between the threads, as will be explained more fully in connection with Figure 2.

Figure 2:
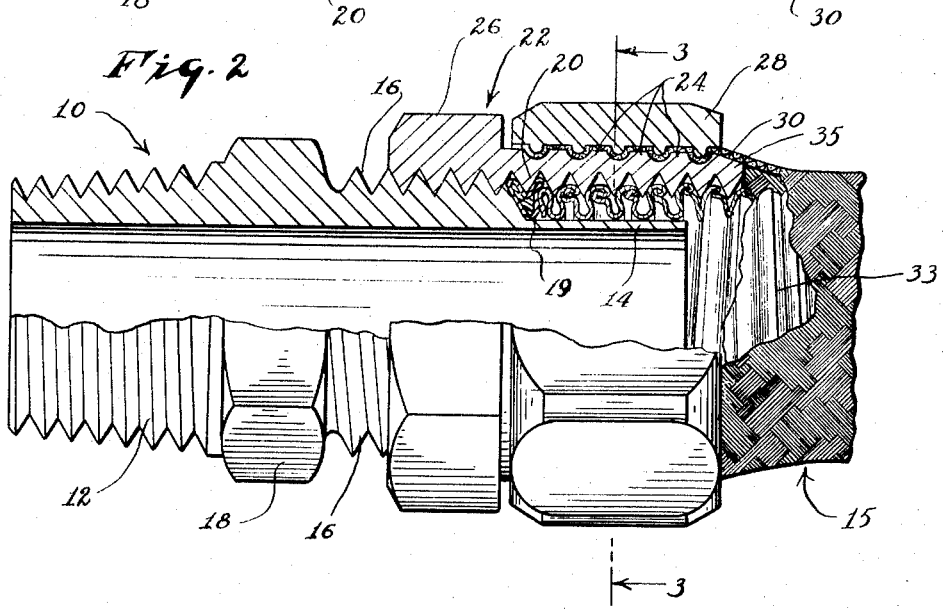
Figure 2 is a greatly enlarged view, partly in section, showing the fitting of Figure 1 with the parts assembled and with the fitting connected to the hose.
Figure 3:
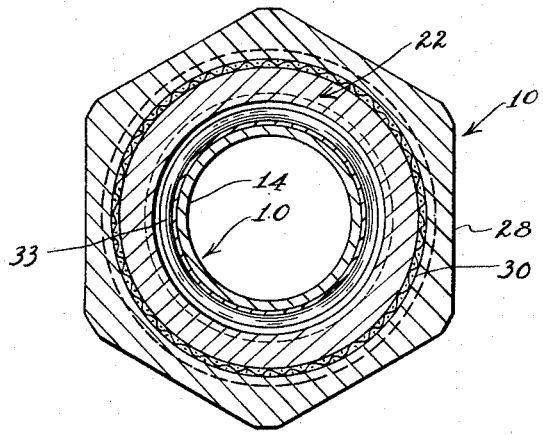
Figure 3 is a sectional view taken on the line 3—3 of Figure 2.

Figure 2 shows the parts in assembled relation. The sleeve portion 14 of the fitting element 10 fits within a helically corrugated portion 33 of the metallic hose with the outside surface of the sleeve portion close to the inside surface of the hose. Since the hose is corrugated, it is only the innermost extending portions of the convolutions that are adjacent to the sleeve portion 14.

The inside threads of the intermediate fitting element 22 screw onto the helical convolutions of the convoluted portion 33 of the hose. It is permissible for the pitch of these inside threads of the fitting element 22 to be slightly less than the pitch of the convolutions of the convoluted portion 33 of the hose so that the convolutions are crowded and somewhat distorted by having the fitting element 22 screwed over them. This provides a tighter fit. It is a feature of the invention that the sleeve portion 14 prevents the convolutions of the hose from moving inward when the intermediate fitting 22 is screwed over them. This permits the threads of the fitting element 22 to be screwed on the hose much more tightly than in constructions which have no means for preventing the convolutions of the hose from being collapsed radially.

Figure 2 shows the gasket 20 clamped between the shoulder at the end of the threaded section 16; and shows the braid 30 clamped between the threads 24 and the inside threads of the nut 28.

The preferred method by which the assembly is made is first placing the nut 28 over the end of the braided cable and sliding the nut back on the cable so that it is out of the way during the initial assembly of the other parts of the fitting. The braid 30 is then expanded radially for a limited extent at the end of the hose, and the intermediate fitting element 22 is screwed over the helical convolutions of the convoluted portion 33 of the hose for a distance that limits the end of the hose about half way, or a little more than half way, into the fitting element 22. A tapered end 35, of the fitting element 22, flares the braid 30 away from the convoluted portion 33 of the hose progressively along the length of the hose as the fitting element 22 is screwed on the hose.

As the fitting element 22 is screwed on the convoluted portion 33 of the hose, the braid 30 extends along progressively more of the outside face of the fitting element 22 and over the threads 24. It is not necessary that the hose extend into the fitting element 22 far enough for the braid 30 to cover the entire length of the outside threads 24, but a stronger connection is obtained by having the braid 30 cover most, or all, of the axial length of the outside surface on which the threads 24 are located.

In the next step of the assembly of the fitting, the fitting element 10 is inserted into the fitting element 22 at the end remote from the hose 15. The threaded section 16 of the fitting element 10 is screwed into the fitting element 22, and as it advances, the sleeve portion 14 moves progressively further into the convoluted portion 33 of the hose. There is no great strain on the convolutions of the hose until the shoulder 19 clamps the gasket 20 against the end of the convoluted portion 33 of the hose.

Further relative rotation of the fitting elements 10 and 22 tightens the fitting element 22 on the helical convolutions of the hose, but can not strip the threads because the sleeve portion 14 holds the affected convolutions of the hose radially outward in contact with the groove of the thread in the fitting 22.

The gasket 20 may be made of different material depending upon the service for which the hose fitting is intended. If only moderately high temperatures are to be encountered, a heat-resistant plastic or rubber composition gasket can be used; but for higher temperatures it is preferable to use a gasket of asbestos with stainless steel covering. The gasket is distorted, in the assembly of the fitting and by the distortion is forced into intimate contact with the shoulder 19 and the grooves of the threads so as to provide a leak-proof connection between the end of the hose and the elements 10 and 22 of the fitting.

In the final assembly step, the nut 28 is slid forward along the hose and over the portion of the braid 30 which is flared outwardly by the tapered end 35 of the fitting 22. The nut 28 is then screwed over the threads 24; and as it is screwed over these threads, it distorts the braid into the grooves of the threads 34, and tightly clamps the braid against the sides of the threads 24. This clamping action can be made tightest by advancing the nut 28 until it thrusts against the shoulder at the side of the polygonal portion 26. The reaction of this thrust is against the sides of the threads 24 and increases the clamping pressure against the braid 30 located in the threads.

The preferred construction of the invention has been illustrated and described, but changes and modifications can be made, and some features can be used in different combinations, without departing from the invention as defined in the claims.

I claim as my invention:

1. An end fitting for connection to a flexible and helically corrugated metal hose having a metal reinforcing braid on the outside thereof, said fitting comprising an intermediate element having a longitudinal passage therethrough with a thread extending for the full length of the passage, said thread being of a diameter and pitch to substantially correspond with the helical corrugation of the hose to which the fitting is to be connected, an end element with outside threads complementary to the threads of the passage, the end element being screwed into the passage from the end of the passage opposite to that into which the metal hose is screwed, and the end element having a tapered annular shoulder that confronts the end face of the hose to jam the end of the hose against the threads in the passage at any location in the passage to which the hose is screwed and threads of said end element can reach, a sleeve portion on the end element beyond the annular face and fitting snugly within the hose, and a readily removable outer fitting element that secures the braid to the outside of the intermediate element.

2. The renewable end fitting described in claim 1 and in which there is a gasket clamped between the end face of the hose and the shoulder of the end element.

3. The end fitting described in claim 1, and in which there are threads on the outside of the intermediate fitting element in position to screw into the braid, and the outer fitting element is a nut which screws over the outside threads of the intermediate fitting but with clearance between the threads of the intermediate fitting element and the nut for securely clamping the braid into an undulating pattern with the clearance between the threads.

4. The fitting described in claim 3 and in which there is a shoulder on the intermediate element in position to stop the axial advance of the nut so that tightening of the nut against the shoulder exerts an axial thrust between the threads which clamp the braid for increasing the clamping pressure of these threads against the braid.

References Cited in the file of this patent

UNITED STATES PATENTS

| | | |
|---|---|---|
| 48,709 | Emory | July 11, 1865 |
| 98,774 | Fitzgerald | Jan. 11, 1870 |
| 959,187 | Witzenmann | May 24, 1910 |
| 1,756,698 | Oden | Apr. 29, 1930 |
| 1,819,243 | Hubbard | Aug. 18, 1931 |
| 2,294,960 | Carlson | Sept. 8, 1942 |
| 2,479,499 | Le Clair | Aug. 16, 1949 |

FOREIGN PATENTS

| | | |
|---|---|---|
| 850,967 | France | Dec. 30, 1939 |
| 410,513 | Italy | Dec. 22, 1943 |
| 562,352 | Great Britain | June 28, 1944 |
| 151,318 | Australia | May 7, 1953 |
| 155,301 | Australia | Feb. 19, 1954 |